(12) United States Patent
Lyndersay et al.

(10) Patent No.: US 6,898,633 B1
(45) Date of Patent: *May 24, 2005

(54) SELECTING A SERVER TO SERVICE CLIENT REQUESTS

(75) Inventors: Sean Lyndersay, Bellevue, WA (US); Brian Deen, North Bend, WA (US); Alex Hopmann, Seattle, WA (US); Joel Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

This patent is subject to a terminal disclaimer.

(21) Appl. No.: 09/680,120

(22) Filed: Oct. 4, 2000

(51) Int. Cl.[7] .................. G06F 15/173; G06F 15/16; G06F 9/46
(52) U.S. Cl. .................. 709/226; 709/217; 718/106
(58) Field of Search .................. 709/224, 331, 709/229; 700/2; 707/4, 10; 718/105

(56) References Cited

U.S. PATENT DOCUMENTS

| | | | | |
|---|---|---|---|---|
| 5,940,289 A | * | 8/1999 | Iwata et al. .................. | 700/2 |
| 6,101,495 A | * | 8/2000 | Tsuchida et al. .................. | 707/4 |
| 6,161,104 A | * | 12/2000 | Stakutis et al. .................. | 707/10 |
| 6,272,492 B1 | * | 8/2001 | Kay .................. | 707/10 |
| 6,286,047 B1 | * | 9/2001 | Ramanathan et al. .................. | 709/224 |
| 6,339,423 B1 | * | 1/2002 | Sampson et al. .................. | 345/854 |
| 6,609,159 B1 | * | 8/2003 | Dukach et al. .................. | 709/331 |

* cited by examiner

Primary Examiner—William A. Cuchlinski, Jr.
Assistant Examiner—Michael Delagado
(74) Attorney, Agent, or Firm—Workman Nydegger (57) ABSTRACT

Systems and methods for directing client requests and for selecting a back end server to service client requests. A front end server receives client requests and based on the URI of the requests, directs the request to a back end server. The client request can be for a private or a public folder and each back end server typically stores both private and public folders. If the request is for a private folder, then the front end server determines which server stores that user's private folder and directs the client request to that folder. If the request is for a home public folder, the front end server directs the client request to the server that is associated with the private folders of the users. If the request is for an application public folder, then the front end server selects one of the back end servers to service the client request. Advantageously, the front end server always directs the client request to the same server. If the selected server is unavailable, then the front end server is capable of redirecting the client request to an available server.

29 Claims, 3 Drawing Sheets

SELECTING A SERVER TO SERVICE CLIENT REQUESTS

BACKGROUND OF THE INVENTION

1. Related Applications

The following co-pending applications, which are filed the same day as this application, are hereby incorporated by reference: U.S. application Ser. No. 09/679,720, entitled "Routing Client Requests to Back-End Servers, and U.S. application Ser. No. 09/679,716, entitled "Transparently Redirecting Client Requests for Content."

2. The Field of the Invention

The present invention relates to systems and methods for directing a client request to a server. More particularly, the present invention relates to systems and methods for directing a client request by using a front end server to select a back end server to respond to the request.

3. The Prior State of the Art

Many computer networks have a client/server architecture. In these architectures, the client computer is typically the requesting computer and the server computer responds to the request of the client. Client/server architectures can be found networks including local area networks (LANs), wide area networks (WANs), and the Internet. These systems are often used advantageously by various applications. Network messaging systems, for example, are often implemented using a client/server architecture. In network messaging, a mail server effectively functions as a post office for client computers. The mail server receives and distributes incoming electronic messages to the client computers and also forwards outgoing electronic messages.

These systems are becoming increasingly popular and in some systems, including the Internet, there is a great demand for the information that can be stored and managed by server computers. The demand is often significant and a single server computer is often not capable of meeting the demand. To increase accessibility, the data being accessed is often distributed over a bank of server computers. Distributing the data across a server bank, however, presents problems with regard to accessing the data.

For instance, when a new server is added to a server bank, the data is often redistributed over the servers. As a result, the URI of the data may change and clients may not have their requests fulfilled in these types of situations. Personal mailboxes in particular are subject to this problem because they are typically maintained on a single server. When a new server is added to the system and the personal mailboxes are reallocated across the serves, the URI will change.

In order to access this bank of server computers, these systems provide a routing server that receives the client request. However, the routing server usually stores some data and actually services part of the client's request, including Hyper Text Markup Language (HTML) rendering. In addition, the routing server does not really forward the request to one of the servers in the server bank. Rather, the routing server typically uses a separate protocol to access the data in the bank of server computers. The data returned from this server is incorporated into the response sent to the client from the routing server. As a result, the applications of this server system are limited to the applications of the routing server.

Other systems simply use the routing server to route client requests to one of the servers in the server bank. These systems, however, are not able to analyze the requests or perform other operations on these requests other than forward them to one of the servers. Necessarily, each server in the bank of servers completely replicates the data stored on the other servers. This type of system makes no allowance for customized or selective replication. For example, the routing server may be configured to route requests from a particular geography to a particular server in the server bank. Even though this data may be dedicated to a local topic that is of little interest to other users, this data must be replicated on all of the servers in the server bank. The routing server operates under the assumption that all of the data is available from each server. While this type of system does provide a type of load balancing with regard to client requests, this system is unable to respond dynamically at the time of the client request. These systems are also not capable of immediately adapting to new situations, such as adding or removing servers from the bank of servers. In addition, these types of systems cannot utilize selective data replication across the servers.

A system that provides load balancing of client requests against multiple servers therefore faces several issues that are difficult to overcome. For example, there is a need to improve the server efficiency by servicing requests as quickly as possible. Additionally, there is a need to allow access to the requested resources for as long as possible. Often, client requests fail when the server selected by the routing server is unavailable. Finally, there is a need to balance the requests across the available servers while dynamically responding to both changing system conditions and multiple client requests.

SUMMARY OF THE INVENTION

The present invention relates to systems and methods for selecting a server for servicing client requests. The present invention includes a server system that has one or more back end servers connected with at least one front end server. The front end server receives client requests and directs those requests to one of the back end servers. The front end server is also capable of analyzing the client request such that the client requests are balanced across the back end servers. The present invention also balances the needs of timely servicing the client requests, distributing the client requests to the back end servers, allowing access to the requested data for as long as possible, and selecting a back end server that can actually service the client requests.

The selection of a back end server is often based on the user that is making the request, the resource that is the subject of the client request and the URI of the request. The user information can include the user name, the user's authentication token, and the like. The resource can be located in a private folder, a home public folder, or an application public folder. When a request is made to the private folders, the location of the associated user's private folder is determined by the front end server and the client request is forwarded to that server.

When a request is made to a default or home public folder, the user is directed to the server storing the home public folder that is associated with the private folder of the authenticated user. Identifying and selecting a server in this manner maintains the usefulness of status information related to the home public folder such as which items have been read and the like. In other words, client requests for private folders or the home public folder are usually sent to the same server. If the private folder is unavailable, the request is failed. If the home public folder is unavailable, the client request is redirected to a server that replicates the home public folder. This ensures that a user has access to the requested resource if it is available, while maintaining system efficiency.

When a request is made to an application public folder, the user's authentication token is used as a key in a selection module that selects a back end server to service the request. The selection module keeps a list of all servers such that the same server is usually selected for a particular user. One example of the selection module is a hash function that uses the user's authentication token as its key. If the selected back end server is unavailable, then that server is marked as unavailable and the selection module is used to identify an alternative back end server.

In some cases, a server does not store the actual content of a requested resource. In that case, the server returns a list of back end servers to the front end server that do store the requested content. The selection module operates on this shortened list to select a back end server to service the client request.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to systems and methods for using a front end server to direct a client request to a back end server. Client requests can generally be described as requests for private resources or folders and as requests to public resources or folders. In either case, the availability and capability of the back end servers should be accounted for when directing the client request.

While the present invention is described in terms of Hyper Text Transfer Protocol (HTTP), it is understood that the present invention can apply to other protocols as well such as Post Office Protocol 3 (POP3) and Internet Messaging Access Protocol (IMAP). When an HTTP request is initially received, the user may be prompted for authentication credentials. The authentication credentials may be used to select a back end server to service the client request. The front end server also utilizes the Uniform Resource Identifier (URI) of the client request to make a decision regarding which back end server will receive and service the client request. More generally, the URI is the primary determinant used by the front end server to select a back end server and the authentication information is often a secondary determinant. In cases where authentication credentials are not available, only the URI is used. In other cases, a user's authentication token is a primary determinant used by the front end server to select a back end server.

The advantage of using an intelligent front end server to direct client requests is that the client requests will be properly distributed across all of the available back end servers. In addition, the front end server provides clients with prolonged accessibility, server efficiency, and directs client requests to back end servers that can actually service the client's request.

The present invention extends to both methods and systems for directing client requests to back end servers. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
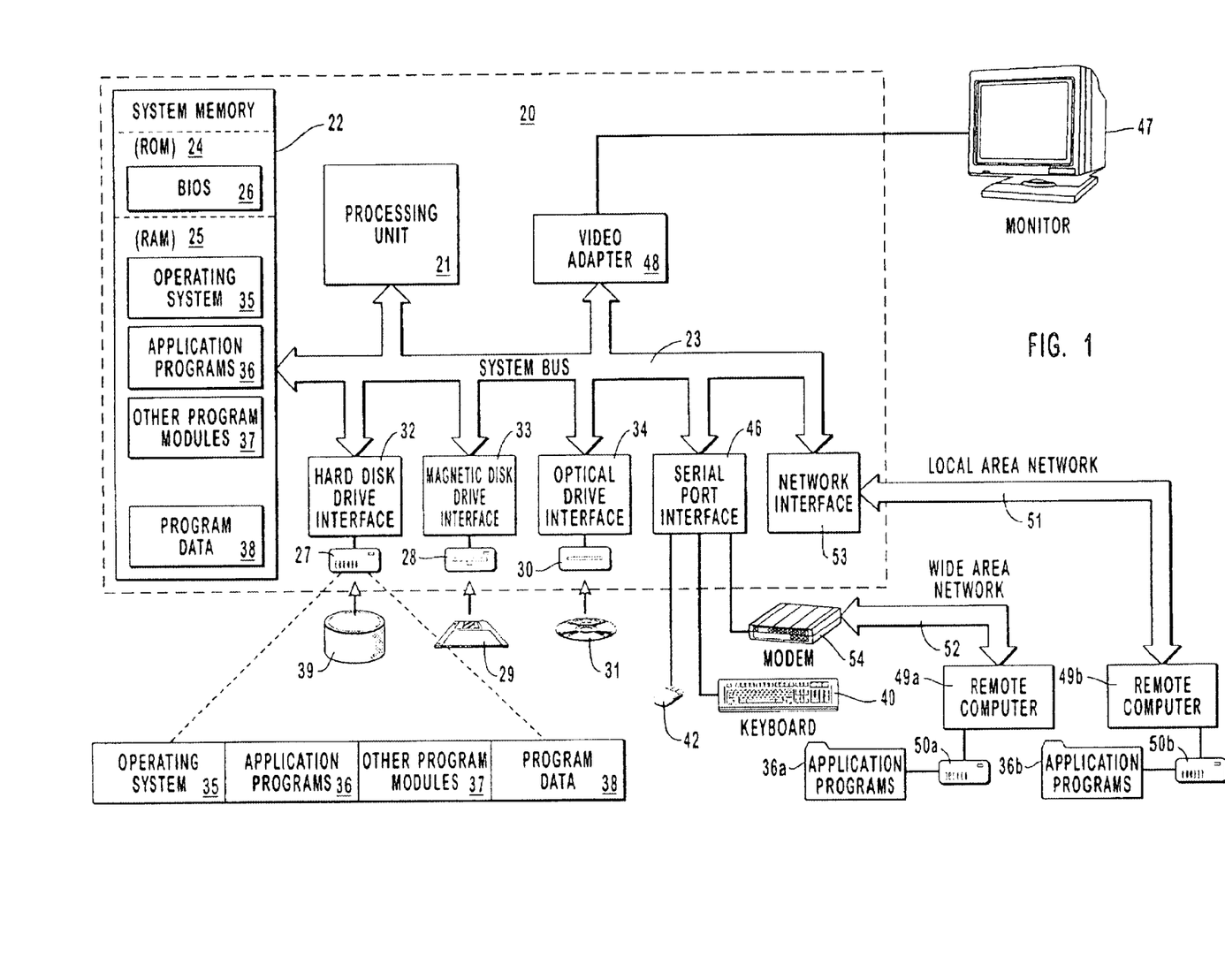
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
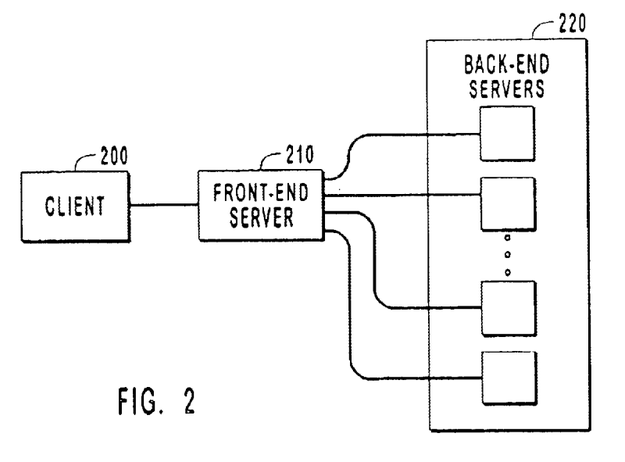
FIG. 2 is a block diagram illustrating an exemplary environment in which the systems and methods of the present invention may be implemented and includes a client connected to a server system that includes a front end server and one or more back end servers.

FIG. 2 is a block diagram that illustrates an environment in which the systems and methods of the present invention may be implemented. In FIG. 2, a client 200 is connected to a server system 201. The server system 201 includes a front end server 210 and one or more back end servers 220. The front end server 210 in this example is stateless and does not have or store any content or data that is the subject of the client request. The front end server 210 also does not require, for example, a hard disk or other form of memory for storing program data. However, the front end server 210 is not precluded from storing or maintaining data. The front end server 210, however, may store data used to select an appropriate back end server to service the client request.

Primarily, the front end server 210 receives requests from the client 200 and directs those requests to one of the back end servers 220. The front end server 210 thus provides a single namespace from the viewpoint of the client 200 and the client 200 is unaware of which back end server actually services the request. In this sense, the front end server 210 functions to direct or route client requests to the appropriate server. This is more fully described in a co-pending application entitled "Routing Client Requests to Back-End Servers," Ser. No. 09/679,720, filed the same day herewith and incorporated by reference in its entirety.

Figure 3:
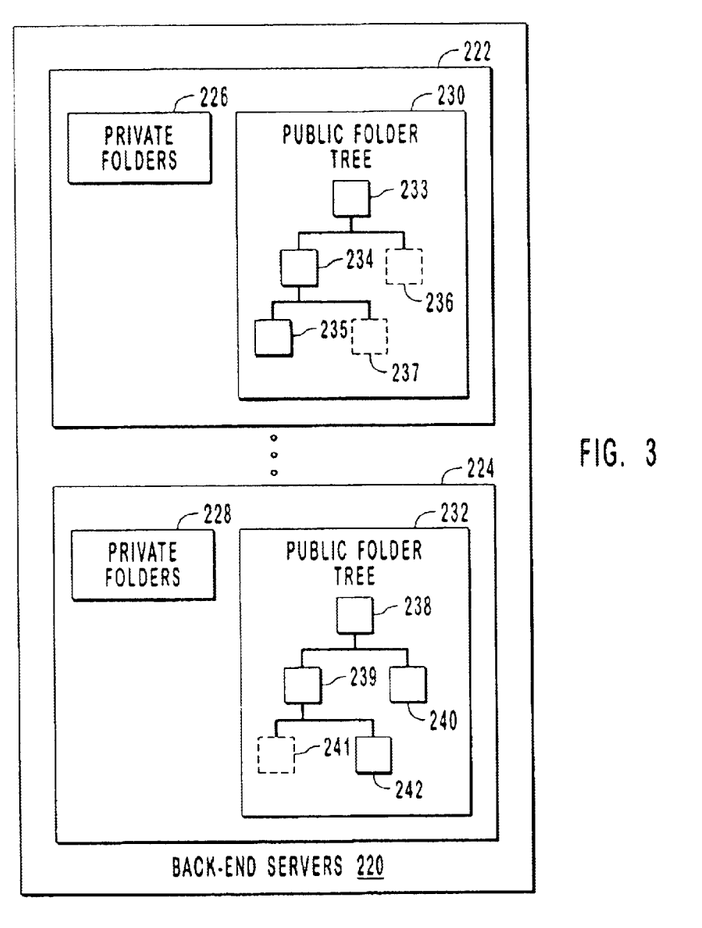
FIG. 3 is a detailed block diagram of back end servers and illustrates the content stored on those servers.

FIG. 3 is a block diagram that more fully illustrates the back end servers 220. The folder hierarchy or structure of each server included in the back end servers 220 is also shown. The back end servers 220 includes, in this example, server 222 and server 224. The server 222 stores private folders 226 and public folders 230, and the server 224 stores the private folders 228 and the public folders 232. The private folders 226 and 228 may be used, for example, as user mailboxes. As a result, the private folders 226 and 228 may have a similar structure, but the content of the private folders 226 and 228 is different because they correspond to different clients or users. More specifically, a particular user's mailbox is only located on a single back end server. For that reason, the mailboxes or content stored in the private folders 226 are not replicated in the private folders 228. Users are typically assigned to a particular server, which has its own private folders. When a user makes a request for a private folder, the request is directed to a specific server that stores the user's private content.

On the other hand, the public folders 230 and 232 not only have similar structure or hierarchy, but also have the same content in most instances. In structure, the folder 233 is identical to the folder 238, the folder 234 is identical to the folder 239, the folder 236 is identical to the folder 240, the folder 235 is identical to the folder 241, and the folder 237 is identical to the folder 242.

In content, however, the public folders 230 may differ from the public folders 232. The difference in content occurs because it is not always necessary for each back end server to maintain all of the content that may be found on other back end servers. For example, the folder 236 and the folder 240 are corresponding folders in identical folder trees, but are located on different back end servers. The folder 236, which is illustrated in a dashed line, does not contain any content and is referred to herein as a ghosted folder. The folder 240, which is illustrated in a solid line, does contain content. If necessary, the content of the folder 240 can be replicated to the folder 236 and the folder 236 would no longer be ghosted.

One of the reasons for organizing the public folders in this manner is related to how often a particular folder is accessed. Where content is actually stored is also related to factors such as geography that may determine which back end server is selected. For example, the private folders of users in a particular geographical location may all be stored on a single server. The home public folder that is associated with those users may contain content that is specific to those users and of little interest to others. As a result, the content of that folder does not need to be replicated on other back end servers because those users are usually directed to their home public folder. Thus, the content may be ghosted on the other back-end servers and replicated as needed.

Another aspect of the back end servers 220 is that each private folder is usually associated with a specific public folder. In FIG. 3, the private folders 226 are associated with the public folders 230 while the private folders 228 are associated with the public folders 232. From the viewpoint of the private folders 226, the public folders 230 are referred to as home public folders, while the public folders 232 are referred to as application public folders. A user is preferably directed to their home public folder when requesting content from the public folders. If the home public folder is unavailable or contains a ghosted folder, then the user may be directed to an application public folder that actually contains the requested data. The back end servers 220 are capable of functioning with application public folders as well as other configurations of top level hierarchies or data configurations.

The front end server, shown in FIG. 2, is primarily responsible for directing client requests to one of the back end servers. The selection of a back end server to service client requests is a difficult task and several factors, such as server efficiency, system efficiency, accessibility, and correctness, should be considered. Server efficiency relates to servicing the client request as quickly as possible. System efficiency relates to balancing all of the client requests across all of the available back end servers such than each of the back end servers does not service an inordinate amount of client requests. Accessibility refers to affording a client with access to a particular resource for as long as possible and correctness refers to selecting a back end server that can actually service the client's request.

When a back end server is selected or accessed, client requests to private folders and client requests to public folders should be considered. In each case, the client request can be affected by whether the selected back end server is available and whether the back end server can actually service the request. Availability may be a temporary condition while the ability of the back end server to service the request may be dependent on compatibility issues and is a more permanent condition.

Figure 4:
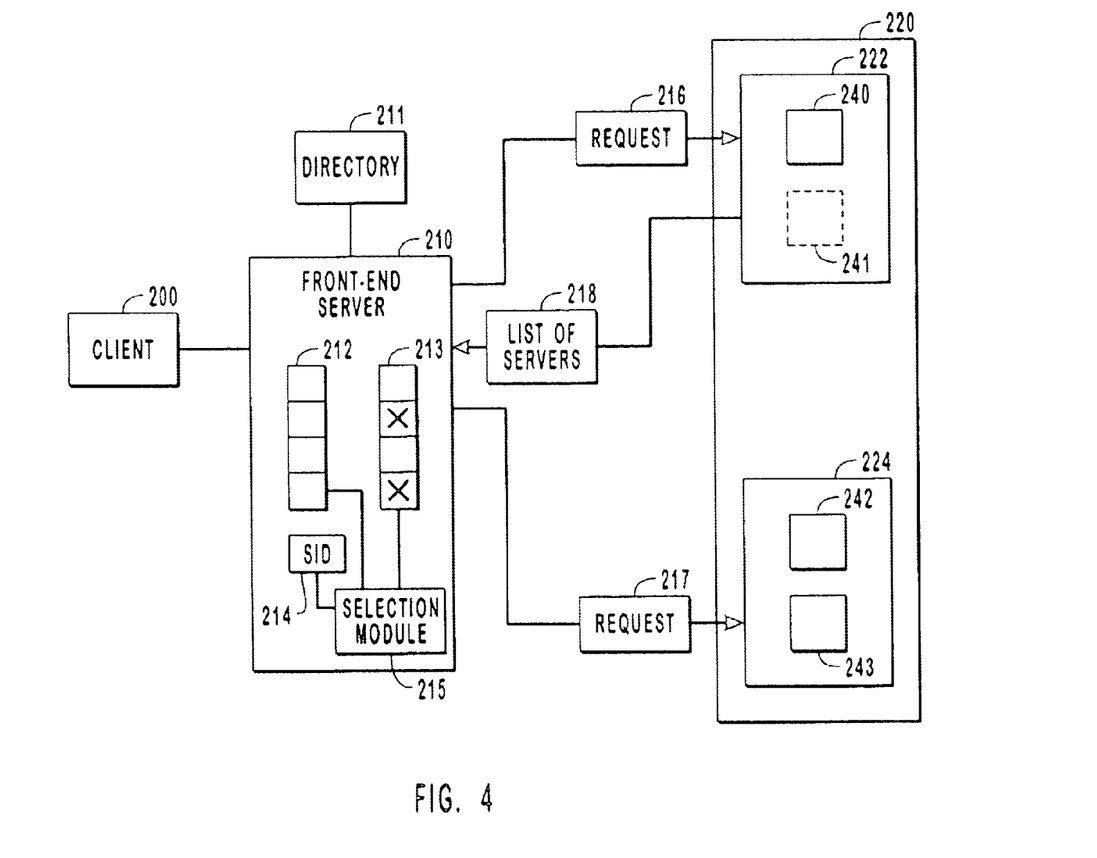
FIG. 4 is a block diagram illustrating a front end server that selects a back end server to service a client request and directs the request to the selected server.

FIG. 4 is a block diagram that illustrates how a back end server is selected by the front end server to service a client request. The front end server 210 has access to a directory 211 that contains metadata including configuration information. The configuration information includes, but is not limited to, mapping users to their mailbox server and their mailbox store, mapping a mailbox store to a public folder server, and mapping a public folder tree to public folder servers.

The front end server 210 either accesses the directory 211 directly to obtain the configuration information, or maintains a copy of the directory 211. In the case where the private folders represent personal mailboxes, the directory 211 may be used to identify which mailbox server and which mailbox store are associated with a particular user. The directory 211 also identifies the home public folder that is associated with a particular mailbox store. In this manner, the home public folder for a particular user may be determined. The directory 211 may also be accessed to determine which servers maintain a copy of a particular public folder tree. It is possible that more than one public folder tree can be present on the back end servers. Additionally, all of the servers are not required to have all of the public folder trees. More generally, the data stored on the back-end servers does not have to be replicated in its entirety on all of the back end servers.

When a request is received from a client 200, an initial determination is made by the front end server 210 as to whether the client request is directed to the user's private folders, the home public folder, or to an application public folder. Using the directory 211, the front end server 210 examines the Uniform Resource Identifier (URI) received in the client request to identify the resource the user is attempting to access (read, write, copy, move, save, delete and the like), and whether the client request is directed to the private folders, the home public folders, or to application public folders. If the URI cannot be identified as one of these types, then the client request is typically failed.

For example, if a client request contains a URI of "http://server/mailbox/user," then this request is intended for the mailbox of the user, which is located in the private folders. The front end server 210, in this case, determines which back end server is the mailbox server for this user from the directory 211, which contains metadata identifying the location of the user's mailbox. If the URI of the client request is http://server/mailbox, then the front end server 210 will look up the username associated with the authenticated user and proceed as if the request had contained the username of the authenticated user, as described above. After the back end server is determined or selected, the client request is directed to the identified back end server.

Another situation handled by the front end server 210 is where the client is attempting to access the public folders. When the client request is received at the front end server 210, the configuration information in or from the directory 211 is used to determine that the client request is directed to the public folders. Within the directory 211, the virtual root associated with the URI of the client request is mapped to a physical location. The path name of the actual location of the requested data may contain the string "public folder." If this string is detected in the path, then the front end server 210 determines that the client request is directed to the public folder. Even though the virtual root may change, the actual physical location will most likely contain a string that can be used to determine that the client request is directed to the public folders. The actual string used to make this determination can vary and is not limited to "public folder." It is understood that the front end server 210 is not precluded from determining that the client request is directed to the public folders using other methods.

The next issue is determining which back end server will serve this client request to access the public folders. As previously described, each user has an associated home public folder. The home public folder of a particular user is associated with the private folder of that user and is typically located on the same back end server as the private folders of the user. Thus, a request for the public folder is typically sent to the home public folder every time a new request from a particular user is received by the front end server 210.

This is important because each public folder on each back end server is effectively the same as described with reference to FIG. 3. However, only the home public folder of a user stores status information such as when a user has read an item and which items have not been read. Maintaining this type of information is particularly useful when a user is always directed to the same home public folder. This information would not be useful if a user were not directed to the same back end server. Thus, the front end server 210 directs all requests from a particular user to that user's home public folders when possible.

The next situation involves a URI that refers to an application public folder or top level hierarchy system. The front end server 210 obtains a list of servers 212 from the directory 211 that have a replica of the application folder tree that is referenced by the URI in the client request. The front end server 210 also has access to the user's authentication token or security identifier (SID) 214. In order to determine which back end server to send the client request to, the front end server 210 uses the SID 214 as input to the selection module 215 in order to select one of the back end servers in the list of servers 212. One example of the selection module 215 is a hash function.

Using the SID 214 as a key in a hash function ensures that exactly one server in the list of servers 212 will be selected and that the same server will be selected for the user assuming that the number of back end servers does not change. In this manner, client requests from a particular user are sent to the same server when possible. In addition, the hash function is able to spread the client requests across all of the available back end servers 220 because the SID 214 of each user is different. Thus, the system efficiency is maintained by distributing the client requests across all of the back end servers 220.

As shown in FIG. 4, after a back end server has been selected, the request 216 is forwarded to the selected server, which is shown as back end server 222. The back end server 222 services the request 216 if possible. If the back end server 222 is unavailable, then the server is marked as unavailable in the list of servers 212. For illustrative purposes, the list of servers 212 with servers marked as unavailable is shown as the list of servers 213.

When a selected back end server is unavailable, nothing is usually returned to the front end server 210, although that server is marked as unavailable as described. When the selected back end server is unavailable, the hash function is performed against the remaining servers in the list of servers 213 in order to select a different back end server to service the client request.

In some instances, the front end server 210 will already have some of the servers in the list of servers 212 marked as unavailable when an initial client request is received. However, these servers are not excluded from the hash function in order to ensure that the same back end server is repeatedly selected. Altering the number of servers in the list of servers 212 could result in an uneven distribution of client requests across the back end servers 220. If, however, the hash function does select a server that is marked as unavailable, then that server is removed from the list of servers 212 for that request only and the hash is re-executed to select a back end server to service the request. This process can be repeated until either a functioning back end server is selected or it is determined that none of the back end servers host the requested content. Servers that are marked as unavailable are periodically reevaluated to determine their availability and the mark is removed when they are available.

Once a valid back end server has been selected, the request 216 is sent to the back end server 222 to service the request. In this case, the back end server 222 has resource 240 and resource 241. The resource 241, indicated by dashed lines, is ghosted and the content of that resource is not physically present on the back end server 222. If the request 216 is for the ghosted resource 241, the back end server 222 sends a list of servers 218 to the front end server 210 that contains a list of all back end servers that actually do store the requested content. The list of servers 218 returned by the back end server 222 is typically a subset of the list of servers 212. The front end server 210 executes the hash function on the list of servers 218 to select a back end server to service the client request. In this example, the back end server 224 is selected and the request 217 is then sent to the back end server 224, which does store the content in the resource 243 that is ghosted in the resource 241 and was the subject of the initial request 216. As more fully described in the co-pending U.S. application Ser. No. 09/679,716, entitled "Transparently Redirecting Client Requests for Content," filed the same day herewith and incorporated by reference, the redirection of the request 216 from the back end server 222 to the back end server 224 is transparent.

Another aspect of the present invention is that when the front end server 210 is generating the initial list of servers 212, one or more tiers of servers are generated. For example, the first tier of servers may include back end servers that provide fast access when compared to other back end servers. Alternatively, some back end servers included in the first tier may have larger bandwidths than other back end servers. These types of back end servers are included in the first tier of servers in the list of servers 212, while the remaining servers are classified into other tiers. The front end server 210 usually attempts to select a back end server that is in the first tier when selecting a back end server to service a client request. If a first tier server is not selected, the systems and methods described herein will be applied to the second tier of servers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including a client and a server system including a front end server and one or more back end servers, a method for directing a client request to a particular back end server, the method comprising the acts of:

identifying the particular back end server from a directory if the client request is for a private folder, wherein only the particular back end server stores the private folder of the client;

identifying the particular back end server from the directory if the client request is for a home public folder, wherein only the particular back end server stores the home public folder of the client;

identifying the particular back end server, from a list of a plurality of back end servers capable of servicing the client request, using a selection module if the client request is for an application public folder, wherein the selection module identifies the same particular back end server from the list for each client request of a particular user; and directing the client request to the particular back end server.

2. A method as defined in claim 1, wherein the directory includes configuration information.

3. A method as defined in claim 1, wherein the directory associates a URI of the client request with the private folder, associates the private folder with the home public folder, and associates each of the one or more back end servers that have a replica of the home public folder.

4. A method as defined in claim 1, wherein the act of identifying the particular back end server from a directory if the client request is for a private folder further comprises the act of examining the URI to determine a username.

5. A method as defined in claim 1, wherein the act of identifying the particular back end server from the directory if the client request is for a home public folder further comprises the act of identifying a string in the directory to determine that the client request is for a home public folder.

6. A method as defined in claim 1, wherein the selection module performs a hash function using the list of back end servers and a security token of a user to select the particular back end server.

7. A method as defined in claim 2, further comprising the act of servicing the client request with the particular back end server.

8. A method as defined in claim 2, wherein the configuration information associates a username with the private folder, and wherein the username is identified from one of the URI of the client request or authentication information of a user.

9. A method as defined in claim 2, wherein the configuration information associates the home public folder with the private folder.

10. A method as defined in claim 2, wherein the back end servers include ghosted folders.

11. A method as defined in claim 5, wherein the string is "public folder."

12. A method as defined in claim 6, wherein one or more of the back end servers included in the list of back end servers is marked as unavailable, wherein the hash function does not exclude a back end server that is marked as unavailable unless the particular back end server selected by the hash function is marked as unavailable.

13. A method as defined in claim 10, further comprising the act or returning a subset of servers to the front end server if the particular back end server ghosts a content requested in the client request.

14. A method as defined in claim 13, wherein the selection module selects a new back end server from the subset of servers to service the client request.

15. A method as defined in claim 14, wherein each of one or more back end servers included in the subset of servers actually store the content requested in the client request.

16. A method as defined in claim 14, further comprising the act of directing the client request to the new back end server.

17. In a system including a client and a server system including a front end server and one or more back end servers, a method for directing a client request for content in an application public folder to a particular back end server, the method comprising the acts of:

identifying a security token of a user associated with the client request;

identifying a list of back end servers from a directory, wherein each back end server in the list of back end servers has a replica of the application public folder;

selecting the particular back end server from the list using a selection module, wherein the selection module hashes the security token of the user to identify the same particular back end server within the list of back end servers for each of a plurality of requests to be received from the user; and directing the client request to the particular back end server selected by the selection module.

18. A method as defined in claim 17, wherein the particular back end server selected by the selection module ghosts the content requested in the client request.

19. A method as defined in claim 18, further comprising the acts of:

the particular back end server sending a subset list of back end servers to the front end server, wherein the subset list includes each of the one or more back end servers that actually stores the content;

selecting a new back end server from the subset list with the selection module; and directing the client request to the new back end server.

20. A method as defined in claim 17, wherein the particular back end server is unavailable.

21. A method as defined in claim 20, further comprising the acts of:

marking the particular server as unavailable in the list of back end servers;

selecting a new particular server from the list of back end servers with the selection module, wherein the unavailable back end server is not excluded from the list of back end servers unless the unavailable back end server is selected by the selection module; and directing the client request to the new particular server.

22. A method as defined in claim 17, wherein at least one of the back end servers included in the list of back end servers is marked as unavailable and wherein the act of selecting the particular back end server comprises the act of keeping the marked back end servers in the list of back end servers when the selection module selects the particular back end server.

23. A computer readable medium containing computer executable instructions for executing the acts recited in claim 17.

24. In a system including a client and a server system, the server system including a front end server and one or more back end servers, a computer program product for implementing a method for directing a client request to a particular back end server, the computer program product comprising:
- a computer-readable medium carrying executable instructions for performing the method, wherein the method includes the acts of:
  - identifying the particular back end server from a directory if the client request is for a private folder, wherein only one of the one or more back end servers stores the private folder of the client;
  - identifying the particular back end server from the directory if the client request is for a home public folder, wherein only one of the one or more back end servers stores the home public folder of the client;
  - identifying the particular back end server, from a list of a plurality of back end servers capable of servicing the client request, using a selection module if the client request is for an application public folder, wherein the selection module identifies the same particular back end server from the list for each client request of a particular user; and
  - directing the client request to the particular back end server.

25. A computer program product as defined in claim 24, wherein the directory associates a URI of the client request with the private folder, associates the private folder with the home public folder, and associates each of the one or more back end servers that have a replica of the home public folder.

26. A computer program product as defined in claim 24, wherein the act of identifying the particular back end server from a directory if the client request is for a private folder further comprises the act of examining the URI to determine a username.

27. A computer program product as defined in claim 24, wherein the act of identifying the particular back end server from the directory if the client request is for a home public folder further comprises the act of identifying a string in the directory to determine that the client request is for a home public folder.

28. A computer program product as defined in claim 24, herein the string is "public folder."

29. A computer program product as defined in claim 24 wherein the selection module performs a hash function using the list of back end servers and a security token of a user to select the particular back end server.

* * * * *